United States Patent Office 3,222,181
Patented Dec. 7, 1965

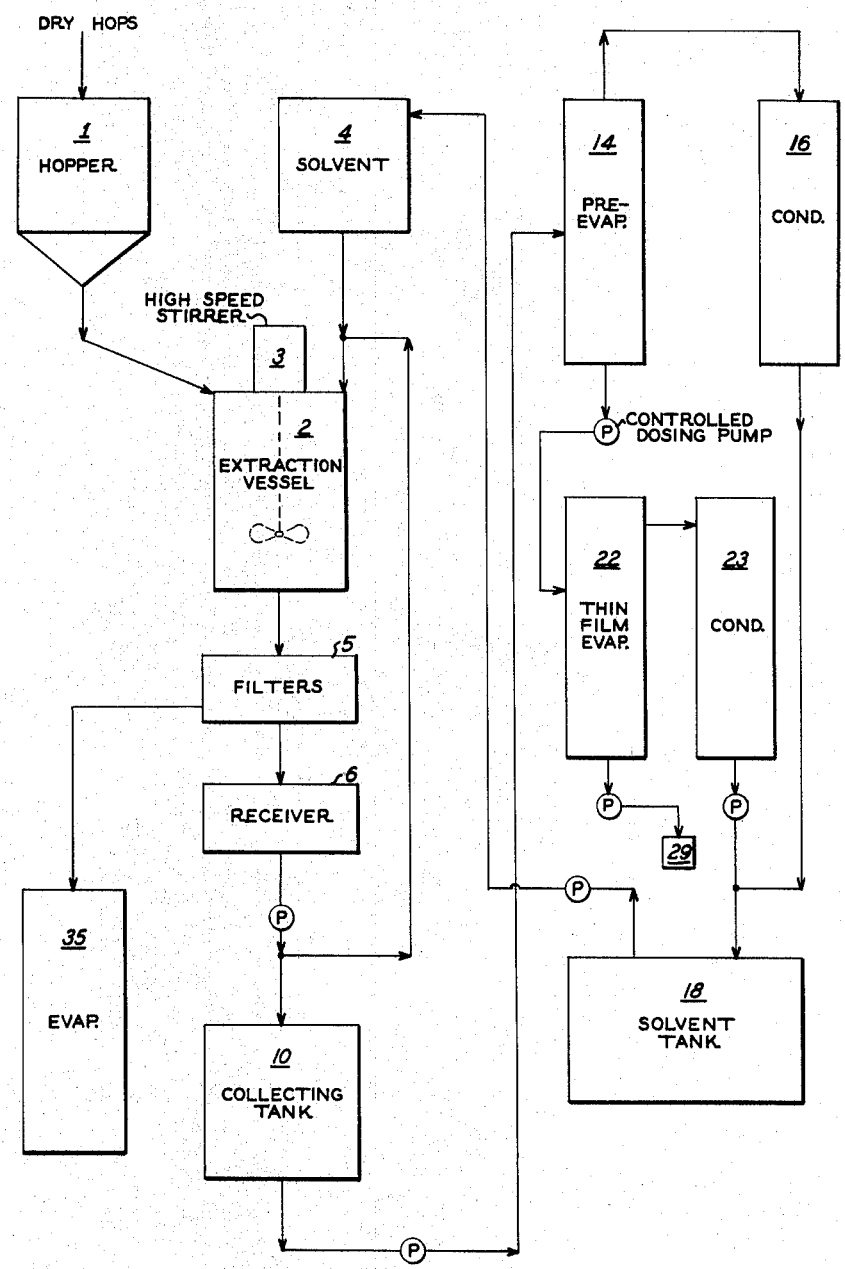

3,222,181
METHOD OF PRODUCING HOP EXTRACTS
Alfred Hoelle and Heinrich Vollmar, Rheinfelden, Germany, assignors to Maria Briem, Au, Hallertau, Germany, a German person
Filed Sept. 27, 1962, Ser. No. 226,529
Claims priority, application Germany, Mar. 11, 1960, B 57,029
2 Claims. (Cl. 99—50.5)

The application is a continuation-in-part of U.S. application Serial No. 43,667, filed July 18, 1960 and now U.S. Patent No. 3,092,497.

This invention relates to new and useful improvements in the production of hop extracts.

This invention more particularly relates to a novel process for the production of hop extracts having a high concentration of the essential principles of hops.

Numerous efforts have been made in the past in the brewing industry in attempts to reduce the cost of the production of beer and to manufacture a product of high uniform quality, excellent taste, clarity, and stability. In this connection attempts have been made to improve the yield in essential principles and, in particular, of the flavoring principles as, in the conventional cooking of the grain, only about 3.5% of these principles pass over into the beer.

It has already been proposed to replace at least a portion of the bulk hops as used in the production of beer by a hop extract. The hop extract is prepared conventionally by treating the hops with water and thereafter with an organic solvent, such as an alcohol, ether or halogenated hydrocarbon. Subjecting the hops to an extraction treatment has been found to increase the yield of flavor principles and additionally, when using hop extracts rather than bulk hops, the quantity in volume of hops added per each gallon of beer may be considerably reduced.

The known methods of producing hops extracts, however, have the disadvantages that they require very long extracting periods and, even then, result only in low concentrations of the flavor principles in the extract. Furthermore, unless solutions may be used directly with water, it is generally necessary to drive off the very large quantities of solvents contained therein, which in view of the low yields renders the extracting process very expensive.

In the conventional processes for brewing beer, as heretofore practised, there has been added to each brew batch a hop extract and bulk hops. Generally, there has been added to the brew about 30–50% of bulk hops and from about 70–50% of the total dose of the hops of a hop extract. The hop extracts as heretofore available consist only of about 30–35% of extracted materials, the remainder being water and insoluble materials, such as fibers, sediments, water, and such.

One object of this invention is a novel process for the production of hop extracts having a high content of the bitter principles without the abovementioned disadvantages.

Another object of this invention is a novel process for the production of hop extracts in which substantially all of the essential principles of hops, namely, hop oil, lupulin, and tannin are contained in the extract.

Still another object of the invention is to facilitate the commercial production of hop extracts by making available a process wherein a hop extract having a high content of the essential principles of hops is produced by action of small quantities of solvent on the hops.

A further object of this invention is a novel process for the production of hop extracts having a high content of the essential principles of hops which will be stable indefinitely.

Other objects and advantages will be apparent from the claims and description which follow.

These and other objects are attained by means of this invention, wherein it has been found that hop extracts having an extraordinarily high content of the essential principles of hops may be obtained in a simple, commercially feasible manner with the use of relatively small amounts of solvent if the hops are subjected to the action of a solvent and simultaneously comminuted to a degree of fineness, permitting the extraction from the hops of substantially all of the essential principles contained therein while allowing ready separation of the hops residue, the latter substantially completely containing nothing but vegetable fibrous materials. The liquid extract in accordance with the invention contains substantially all of the essential principles of the hops obtainable and following separation of the solvent comprises about 70–90% of bitter principles (and which have been derived from the resins by solvent extraction which give a bitter flavor to all beer and ale), the remainder—i.e., 10–30%—consisting of sediments, tannin, pectin, albumin, and water. The extract of the invention contains the bitter principles in a particularly effective form, the actual bitter imparting capacity of the extract being greater than is to be expected on the basis of the flavoring resin concentration therein. As a result, it is possible to use less of the extract to flavor the beer or ale than was to be expected from the calculation as to the amount of hops required. In fact, in accordance with the invention, the extract may be used in an amount corresponding to 90% of the required hops dose.

Furthermore, the beer obtained using otherwise identical brewing methods, in the case where the highly concentrated hops extract in accordance with the invention is used, is characterized by a uniformly, constant, fine, bitter taste, a desirable hops aroma, and by a freedom from turbidity due to the stability of the extract.

The stability of the extract represents a most important advantage associated with the invention. The extract at the concentration at which it is formed in the process and maintained for shipment and for storage purposes is stable indefinitely. This is a consequence of the extraordinarily high concentration of the hop extract. The unlimited stability is particularly important where the same is required to be prepared, stored, maintained, etc., in tropical or sub-tropical areas or where refrigeration is inadequate. A possible explanation of the good stability may be due not only to the high concentration of the valuable brewing substances in the extract but also to the relationship existing between the extracted components in the extract.

Thus it can be seen that the hop extract in accordance with the invention is characterized by a flavoring ability or power increase as compared with the amount of flavor resins present and by an exceptional stability.

The process in accordance with the invention of making the hop extract is carried out by mixing with the hops an organic solvent, such as for example a chlorinated hydrocarbon, an ether, or acetone in a vessel or tank in which simultaneously the hops are subjected to an extensive comminution so as to completely break down the hops and permit by the action of the solvent the removal of all of the extractable material present. The comminution is further regulated so that the residue of the hops is sufficiently coarse that the same may be readily separated from the extract solution as, for example, by filtration. This comminution-extraction may be carried out in any one of several types of devices but preferably with the apparatus hereinafter described.

Following the extraction which is carried out without the application of any heat and preferably at room temperature, the extract solution in the extraction comminution treatment frequently acquiring a temperature up to about 30° C., a separation of the hops residue is carried out. The separation of the extract from the residue takes place by filtering, siphoning, decanting or centrifuging. Thereafter, the clear liquid extract is freed from the solvent by evaporation to obtain a highly concentrated hop extract substantially free of solvent. The evaporation is carried out at a temperature sufficient only to evaporate the solvent and so that none of the easily volatilized extract components is driven off.

While heretofore it has been proposed to extract hops with organic solvents, the known procedures did not result in the production of highly concentrated extracts. Furthermore, it was necessary to first subject the hops to a preliminary treatment and specifically to a dehydration and thereafter to a pulverization. An alternative pretreatment procedure necessitated freezing the hops and thereafter performing the pulverizing. Only following such pre-treatment were the hops subjected to an extraction treatment. Contrastively, in accordance with the invention, comminution and the extraction are carried out simultaneously in one step and no pre-treatment of the bulk hops, i.e., dehydration or freezing, is required.

Examples of, but not exhaustive of, the solvents which may be used in the process of the invention include any organic solvent in which the essential principles of hops—namely, hop oil, lupulin, and tannin—are solvents such as, for example, ethers (for instance, petroleum ether), alcohol (for instance, methanol), halogenated hydrocarbons (for instance, methylene dichloride, isopropylene chloride, dichloroethylene, trichloroethylene or perchloro ethylene), and hydrocarbons and esters (for instance, ethyl acetate), etc.

The degree of comminution achieved in the extracting comminution step is critical for obtaining a highly concentrated extract—i.e., extract composed of about 70–90% of essential principles. The conventional agitation, as for example, stirring the hops-solvent mixture with high speed agitators does not suffice even where the agitators are provided with knife edges. The use of rotary devices in connection with which the hops and solvent are passed through narrow slots of a rapidly rotating device also does not result in the production of good quality, highly concentrated, hop extracts.

The most satisfactory extraction results when the bulk hops are subjected to a simultaneous comminution using for the comminution a device suspended downwardly into the extract solution into which the extraction mixture of hops and solvent is centrally introduced and thrown outwardly with great force by rapidly rotating toothed rings into the free space of the extraction tank or vessel only to be sucked up again. The same material is passed through the rotating device a great number of times over a very short period whereby the desired comminution and extraction takes place in the one extraction tank or vessel. High-frequency extraction devices as just set out have been developed by Janke and Kunkel, K.G., at Staufen in Breisgau, and are marketed under the names of "TURRAX" and "ULTRATURRAX."

The bulk hops should be comminuted to the extent that the hops particles are obtained having a particle size of about 30 to 1500 μ and preferably averaging about 50 to 1000 μ. Under such conditions, substantially all of the essential principles of the hops are extracted into the solvent and yet the subsequent separation of the hops residue from the extract solution is easily carried out. The extract thus obtained will contain nearly all of the solvent employed and may then be re-employed on another similar operation of hops and the process repeated until the extract has reached the highest concentration of hops obtainable. It is possible in accordance with the invention by re-employing the extract as the extracting agent, as for example for 3 to 6 fresh portions of hops, to obtain a hops extract solution already containing about 10% of extracted substances.

A better understanding of the invention may be obtained by referring to the following dislosure and the drawing, which is a flow diagram illustrating one preferred embodiment of the invention.

Dry hops or hops which have been subjected to a preliminary treatment with water vapor are introduced into a hopper 1. From the hopper the hops are conveyed to an extraction tank or vessel 2 provided with dispersing device 3. Solvent, as for example trichloroethylene, is simultaneously supplied from container 4 into extraction vessel 2. By carrying out the comminution of the hops in the presence of the solvent by means of the comminutor device 3, it is possible to obtain a sufficient increase in surface area of the hops—i.e., effect an intimate contact between the solvent and hops—that the extraction is substantially completed within a few minutes. The resulting mash is withdrawn from the extraction vessel 2 and then passed into filter 5. After separation of the solid hops residue in filter 5 from the extract solution, the extract solution is recovered and passed into receiver 6. The extract solution in whole or in part may be withdrawn from receiver 6 and re-cycled to line 8 via pump 7 for admission into extraction vessel 2 for use in extracting a further quantity of hops. The solvent rich in essential principles is removed from receiver 6 through line 9 and introduced into collecting tank 10. The extract solution is then passed via line 11, pump 12, and line 13 into pre-evaporator 14, in which a part of the solvent is evaporated. The evaporation is controlled by an electronic regulator (not shown). The solvent vapors are removed from pre-evaporator 14 through line 15 and conducted into condenser 16, and thereafter passed by means of line 17 into solvent tank 18. The extract solution which has been concentrated in pre-evaporator 14 is passed into a thin film evaporator 22. The rate of introduction of the extract solution into the thin film evaporator 22 is controlled by a flow controller 20 which is operatively connected between lines 19 and 21; in the thin film evaporator the remainder of the solvent is separated. The extract recovered from this evaporation is substantially pure and is completely solvent-free. The solvent from evaporator 22 is introduced into condenser 23. The condensed solvent is removed from condenser 23 through line 25 and pump 24 and passed into solvent tank 18. The purified extract from thin film evaporator 22 is passed via line 26, pump 27, and line 28 into containers 29. The containers are thereafter hermetically sealed with the extract at the temperature at which it was withdrawn from evaporator 22, whereby there is formed in the container in the cooling a preserving vacuum. The containers are then ready to be stored, shipped, etc.

The spent hops residue which still contains some solvent following the filtering is advantageously treated for recovery thereof. The solvent recovery is conveniently carried out by introducing the wet hop residues into an evaporator 35 via line 34 and therein preferably by treatment of the residue with water vapor evaporating the residual solvent. The solvent vapors recovered are condensed in a condenser and recycled back into solvent tank 4.

The hops residue remaining after separation of the solvent still contains tanning materials and some plant products, such as celluloses, pectin, albumins, organic acids, etc., which are also important in connection with the brewing process. The tannins act to precipitate the albuminous substances of the wort and/or the new beer, and the organic cell constituents of the hops have a favorable influence on the creation and maintenance of foam on the beer. These substances are water-soluble and therefore they are recovered in a second process through a leaching extraction of the hops residue with hot water. The hot water extract is evaporated and the tannins, etc., recovered and advantageously mixed with the other hop principles obtained in the organic solvent extraction process.

It is important that the evaporation of the organic solvent, the evaporation of the residue for solvent recovery and the recovery of the water-soluble components be carried out in vacuum and at temperatures as low as are possible. Thereby no decomposition of the products involved takes place and, furthermore, none of the aromatic principles of the hops is lost by volatilization.

The contact between the solvent and hops must be an intimate and thorough contact and, as carried out in accordance with the invention, is a simultaneous extraction-comminution operation. To carry out this operation, the extraction tank should be provided with a suitable comminution dispersing means, and preferably, the device above mentioned, which is provided with a stirrer having a dispersing head constructed of rings rotated at high speeds in opposition directions, each ring being provided with slots, or, alternatively, with alternating, rotating, and stationary rings. The dispersing head produces waves or surges in its rotation in the solvent hops mash, the number of these waves being dependent on the diameter of the dispersion head and on the speed of rotation of the drive motor. As a result, there is produced in the dispersion head device a rim velocity which maintains the mash in motion within the vessel.

As the waves or motion which is produced are dependent on the rim velocity and since the device is provided with several toothed rings, the teeth of which are positioned closely adjacent one another, and as in the individual toothed rings there are provided slots, there is produced in the interior of the dispersion head a central suction effect coupled with an outwardly expelling effect, whereby the mash drawn into the device is pressed with great force through the slots.

In one form of construction of the comminuting dispersing device as manufactured by Janke and Kunkel, K. G., the toothed rings are arranged so that the distance between them amounts to 4–10 mm. The mash is, by means of the rapidly rotating toothed rings so arranged, additionally subjected to a very strong shearing action. The frequency of the suction or intake and expelling impulses of the comminuting dispersing device is dependent on the number of teeth in the outer ring and also on its number of revolutions. The suction and expelling action creates additional surging impulses which, in turn, are exerted in the mash. The rim velocity of the toothed rings amounts to at least 2 m. per second, and preferably more than 15 m. per second. The number of the suction and expelling impulses in the toothed device in general amounts to between 700 and 1,000 impulses per second.

With this dispersing device the mash is subjected to a wide range of surgings back and forth so that the hops are broken down whereby the hop particles are completely exposed to the solvent and the flavoring principles in particular the lupulins extracted substantially completely and rapidly. Not only is the extraction completed rapidly but also all of the essential principles present in the hops are entirely extracted.

The extraction in accordance with the invention also has the technical advantage that the extraction is carried out at moderately low temperatures in vacuum and thereby the essential principles of the hops are not detrimentally affected. The hops-solvent material is processed in the cold in the extraction vessel under the action of the high-speed dispersing device, a very slight heating-up of the mixture taking place aiding the extraction without any special heat supplying means being necessary. Since the exposure to the heating effect is only very brief, no disturbing secondary reactions occur.

The separation of the solvent from the extract is also carried out at approximately the same temperature and preferably in vacuum.

When the process is completed, the pure extract obtained contains the flavoring principles in the form of "Humulone" and "Lupulone" as the soft resins, while the hard resins do not exceed the limit which is inherent in the hops. The high degree of concentration of the extract of 80–95% of substances which will be active in the brewing process, that is, of substances which will be used in the beer depending upon the origin and quality of the hops, ensures not only the stability of the product for an almost unlimited time but also of a very high productiveness in the form of iso-humulone in the wort or in the beer, so that at the addition of the hops to the boiling action, the extract may be applied at a ratio of 1:8 to 1:12 as compared with the dry hops, depending upon the origin and quality of the hops. In the extraction with the organic solvents, the resins are taken up with bitter principle carriers and concentrated in the extract. The hops which also contain tanning material required in the brewing process in order to bring about flocculation of albuminous substances in the wort are, accordingly, following the extraction treatment of the hops residue with the organic solvent subjected to a leaching treatment with hot water, whereby the tanning substances and other valuable water-soluble materials are recovered. The watery solutions are thereafter further treated to produce a concentrated product. The leaching treatment with water is conveniently carried out by subjecting the spent hops residue to treatment with water in a boiler-type apparatus, the mixture being brought to boiling by introduction of steam, 20–40 minutes sufficing for separation of the water-soluble fraction. The boiled mixture is thereafter filtered and the filtrate preferably concentrated.

The amount of the water-soluble material concentrate to be admixed with the extract depends for one thing upon the original ratio of these components in the hops and also on the brewing requirements.

In the extraction of the tanning materials and water-soluble components from the spent residue, the pH value of the water used for the extraction is regulated to be in the alkaline range, and preferably so as to have a pH within the range of 8 to 9. The residue remaining after separation of the water-soluble material contains nothing but vegetable fibrous material and no tannin, oils or lupulin, and can be discarded.

Preferably both the water-soluble materials and the flavoring principle extract are maintained in a fluid condition so that a good uniform mixing may be obtained without difficulties arising.

The hops extract produced in accordance with the invention has a concentration of 70–95% and, because of this high concentration, is stable substantially indefinitely. Furthermore, because of the correspondingly high flavoring effect of the concentrate, the same can be used in smaller amounts and results in a beer meeting the highest requirements with respect to flavor, color, clarity, and foaming properties.

We claim:

1. A process of preparing a hop extract which comprises 70 to 80% referred to the total extract of bitter principles comprising introducing the hops into an extraction zone, introducing an organic solvent into said extraction zone and comminuting the hops in said extraction zone in the presence of said solvent, by passing said solvent hops mixture into a zone defined by at least two concentrically arranged rings, applying a rotational component of movement to said material within said zone whereby the material is moved rapidly outwardly through the ring unit while it is subjected to rotational and shearing action, whereby a dispersion of fine hop particles in said solvent is produced.

2. A process of preparing an extract which comprises 70 to 80% referred to the total extract of bitter principles of hops and 20 to 30% referred to the total extract of a mixture of tannin, pectin, albumen, celluloses, aromatic principles, and water comprising introducing the hops into an extraction zone, introducing an organic solvent into said extraction zone, comminuting the hops in said extraction zone in the presence of said solvent, by passing said solvent hops mixture into a zone defined by at least two concentrically-arranged rings, applying a rotational component of movement to said material within said zone whereby the material is moved rapidly outwardly through the ring unit while it is subjected to rotational and shearing action, whereby a dispersion of fine hop particles in said solvent is produced, separating the comminuted hops and extract, subjecting the comminuted hop material following separation of the solvent to a leaching treatment with water to produce an aqueous extract containing a high percentage of the water-soluble components of hops and combining the water-soluble material extract and the organic solvent soluble material extract to produce an extract containing substantially all of the essential principles present in the starting hops.

References Cited by the Examiner
UNITED STATES PATENTS
| | | | |
|---|---|---|---|
| 1,232,098 | 7/1917 | Schneider | 99—50.5 |
| 2,243,143 | 5/1941 | Wood | 99—50.5 |
| 2,248,153 | 7/1941 | Wood | 99—50.5 |

FOREIGN PATENTS
| | | |
|---|---|---|
| 459,635 | 1/1937 | Great Britain. |
| 837,058 | 6/1960 | Great Britain. |

A. LOUIS MONACELL, *Primary Examiner.*

ABRAHAM H. WINKELSTEIN, *Examiner.*